United States Patent [19]

Hamel

[11] 3,715,240
[45] Feb. 6, 1973

[54] CONTACT ASSEMBLY FOR DRY CELL BATTERY
[75] Inventor: David O. Hamel, Madison, Wis.
[73] Assignee: ESB Incorporated
[22] Filed: Jan. 21, 1971
[21] Appl. No.: 108,298

[52] U.S. Cl. ............................................. 136/134 P
[51] Int. Cl. ........................................... H01m 13/10
[58] Field of Search .......... 136/100, 108, 111, 134 P

[56] References Cited

UNITED STATES PATENTS

| | | | |
|---|---|---|---|
| 3,061,661 | 10/1962 | Seeley | 136/111 |
| 3,347,709 | 10/1967 | Taylor et al. | 136/108 |
| 3,440,105 | 4/1969 | Yamamoto et al. | 136/108 |

Primary Examiner—Donald L. Walton
Attorney—Robert H. Robinson, Raymond L. Balfour, Anthony J. Rossi and Thomas A. Lennox

[57] ABSTRACT

A contact assembly for connecting the terminals of a dry cell stack to the external terminals of a battery is described in which a conductive contact plate connects the top terminal of the cell stack to a first battery terminal. A connector strip nonconductively attached to the contact plate connects the bottom terminal of the stack with a second battery terminal. A method for assembling the connector assembly is also described.

7 Claims, 4 Drawing Figures

PATENTED FEB 6 1973 3,715,240

INVENTOR.
DAVID O. HAMEL

CONTACT ASSEMBLY FOR DRY CELL BATTERY

CROSS REFERENCES TO RELATED APPLICATIONS

Co-pending application U.S. Ser. No. 46,429, filed June 15, 1970 since issued as U.S. Pat. No. 3,655,456 on Apr. 11, 1970.

BACKGROUND OF THE INVENTION

1. Field of the Invention

This invention relates to multicell primary dry batteries. In particular, it relates to the means of making electrical connections in such batteries.

2. Description of the Prior Art

The advent of small transistorized radios has produced a market for miniature 9 volt dry cell batteries. These batteries often comprise a pack of six layer type cells enclosed in a metal housing and having two snap type terminals located at one end of the battery. The need for these batteries is increasing and manufacturers are searching for ways to improve these batteries and reduce their manufacturing costs.

In a typical battery, the six cells each having a nominal terminal voltage of 1.5 volts are placed one on top of the next and connected in series. This gives a total voltage of 9 volts between the two ends of the cell pack. It has been found convenient in the design of the appliances for which these batteries are designed to have the two terminal connections close together. To accommodate this, it has been found desirable to locate both terminals on a single end of the battery. This in turn requires that there be some form of wiring harness within the battery container connecting the two terminals at opposite ends of the cell pack to the two battery terminals at one end of the battery. Many means have been tried for making the two electrical connections. One obvious means is to solder wires from battery to terminals. This was fine for initial production but requires excessive labor when parts are being made in lots of thousands per day. Various forms of pressure contacts have been used. For the most part, the pressure contacts have provided good electrical connections. However, it has been found that additional parts including necessary spacers and insulators are required with the pressure contacts. These loose parts have increased the complexity of the battery assembly operation. As a solution to this, it has been found expedient to make a sub-assembly in which conductor members and insulation are fastened together by suitable attachment means to form a unitized pressure contact connector.

SUMMARY OF THE INVENTION

This invention describes an improved contact strip assembly for dry cell batteries in which a metallic member serves the multiple purposes of mounting board and first end cell to first terminal connector. A second metallic member attached to but electrically insulated from the first metallic member serves as the second end cell to second terminal connector. A principal feature of the connector is that it can be easily assembled on a simple continuous automatic assembly machine. The operational sequence of such a machine is also described.

The design of this invention offers several advantages over other designs. It is composed of a minimum number of parts and it requires a minimum quantity of material. When assembled in accordance with the further teaching of this invention, the several parts of the strip are firmly fastened together to form a single unit suitable for easy handling in battery assembly machinery.

DESCRIPTION OF THE PREFERRED EMBODIMENT

Figure 1:
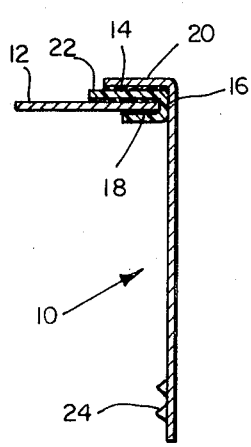
FIG. 1 depicts an elevation of the contact strip of the invention.
Figure 2:
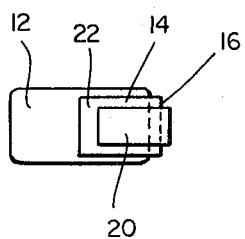
FIG. 2 shows a plan view of the same.

In FIGS. 1 and 2, a contact strip assembly 10 is shown comprising a plate of electrically conductive material 12 such as conductive plastic or steel and having a rectangular shape with the corners rounded off. To this, an insulating coating 14 is adhesively attached so as to cover about one-half of the top of the contact plate 12. The insulating coating 14 can be an adhesive paint or varnish applied by brushing, rolling or spraying or it can be a sheet of insulating material such as tape. In the case of the sheet material, it is advantageous to have it coated on both sides with an adhesive.

The insulating coating 14 is brought down over the edge 16 of the contact plate 12 so as to insulate its edge. The insulating coating can be extended so as to cover a portion of the underside of the plate 12 as shown, or in the case of a sheet material it can be left loose. A ribbon of electrically conducting material such as steel forming a connector strip 20 is attached to the upper side of the insulating sheet 14 and within its borders as shown by the small margin of insulating strip 22. The connector strip 20 is bent at right angles around the end 16 of plate 12. It is seen that the insulating coating lies between the two metallic parts 12 and 20 and electrically insulates one from the other. The connector strip 20 is lanced 24 in the vicinity of its end away from contact plate 12, so as to provide one or more contact points for contact with the bottom cell of the cell stack.

Figure 3:
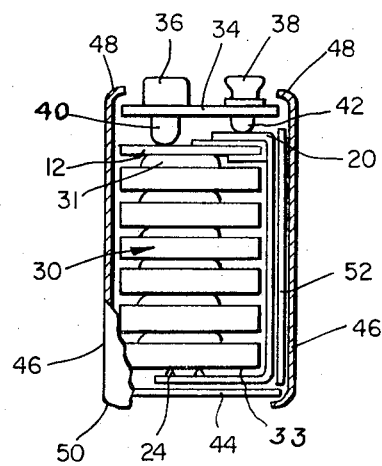
FIG. 3 illustrates a partial cross section view of a typical six cell, 9 volt battery employing the contact strip of the invention.

A partial section of a six cell, 9 volt battery, FIG. 3, serves to indicate the location of the contact strip in a typical assembly. A cell stack 30 having a potential of 9 volts is made up of six 1½ volt cells connected in series. The two terminals of the cell stack are at the top 31 and bottom 33 of the stack respectively.

As is well understood, one of these terminals is positive and one negative. For the purposes of this discussion, it is not necessary to designate which is which other than that the stack has two terminals and that these are of opposite polarity.

A terminal board 34 is located at the top of the battery. The terminals 36 and 38 are fastened by through rivets 40 and 42 to the terminal board. A bottom board 44 is located at the bottom of the battery. A metallic sleeve 46 having its ends 48 and 50 flanged over the terminal board 34 and bottom board 44 forms the battery container and serves to clamp the assembly together. The terminal strip 10 is located between the cell stack and terminal board. It will be seen that due to the clamping pressure supplied by flange 48, rivet 40 is in firm contact with the top of the contact plate 12 while the bottom of 12 is in firm contact with the top terminal 31 of the cell stack. Also, due to the pressure exerted by flange 48, the rivet 42 of contact 38 is in firm contact with the conductor strip 20. The long end of the conductor strip 20 passes down the end of the cell stack and is bent around its bottom so that the contact points 24 touch and make contact with the bottom contact 33 of the cell stack. Pressure from the bottom board 44 keeps the contact points 24 in contact with terminal 33. An insulating strip 52 separates and insulates the conductor strip from the metallic sleeve 46.

It will be understood from the above that the battery described is a collection of loose parts that are combined together in a single final assembly operation. Therefore, the use of a sub-assembly such as the contact strip of the invention, will simplify the assembly operation and reduce the chance of mispositioned parts and consequent battery rejects.

Figure 4:
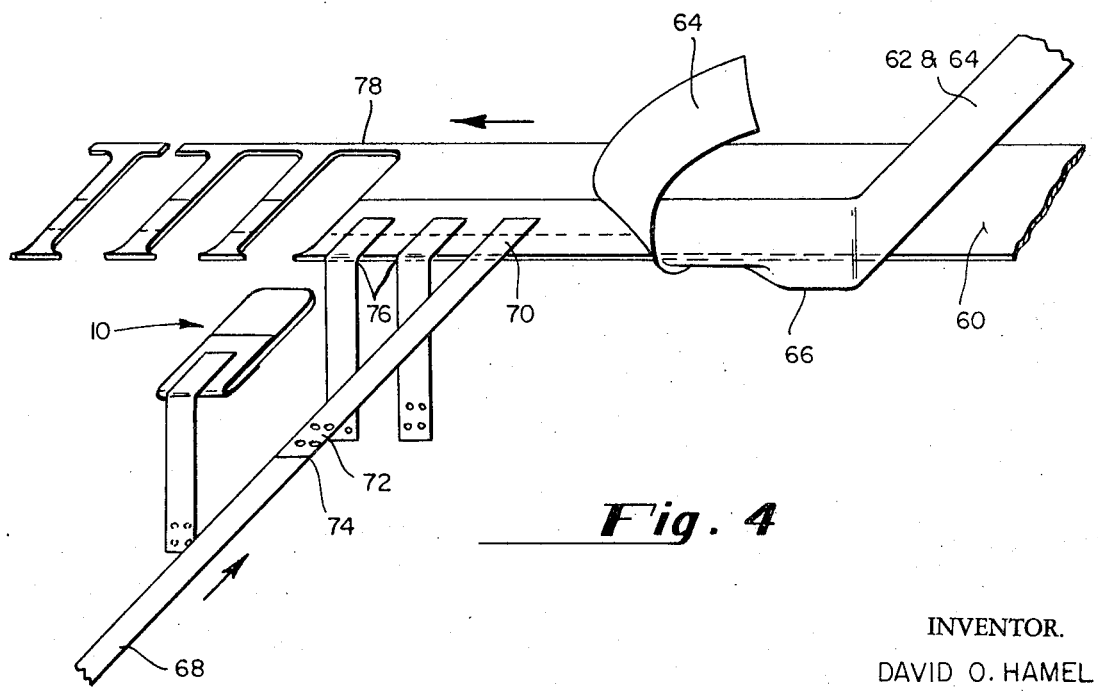
FIG. 4 indicates the several operations involved in the automatic assembly of the contact strip.

The contact strip of this invention can be assembled using standard tools such as die sets and strip feeding devices attached to or mounted on a common mechanical punch press in ways well known in the metal working art. An example of a suitable assembly method is shown in FIG. 4. An electrically conductive ribbon 60 from which the contact plate will be cut is shown feeding in from the right hand edge of the sketch.

A tape of insulating material 62 having an adhesive coating on both sides and having a protective strip 64 on the top is fed to the steel strip. The insulating tape is located so as to cover approximately one-half of the steel ribbon and overlap it at the front edge. At 66 the overlapping edge of the strip 62 is shown being folded around the edge of strip 60. At 64 the protective ribbon 64 is removed from the insulating strip 62.

A second conductive ribbon 68 is fed at right angles to the ribbon 60. At 70 the end of the second ribbon is adhered to the top of the insulating strip 62 by the adhesive on the top thereof. At 72 the conductive ribbon 68 is lanced to make the needed bottom contact points and at 74 the ribbon is cut off. At 76 a right angle bend is formed in the second conductive ribbon and at 78 the contact plate is blanked from the first conductive ribbon so as to produce the finished contact strip 10.

Having thus fully described the contact strip of the invention as well as its use in the construction of a dry cell battery and a means for automatically assembling the strip,

I claim:

1. A dry cell battery contact assembly comprising:
 a. an electrically conductive contact plate having an upper and a lower surface;
 b. an electrically insulating coating overlying and adhered to at least a portion of the upper surface of the contact plate; and
 c. an electrically conductive connector strip having a first portion overlying and attached to a portion of the insulating coating and insulated from the contact plate thereby, the connector strip having a second portion substantially perpendicular to the first portion of the strip and having an end away from the first portion, whereby when the contact assembly is placed on the top of a cell pack having a lower and an upper terminal, a terminal board having two terminals mounted thereon and passing therethrough placed above the contact assembly, the end of the second portion of the connector strip away from the contact plate bent to touch and make electrical contact with the lower terminal of the cell pack, a bottom board placed below the bent portion of the contact strip and a sleeve placed around the entire assemblage and flanged against the top of the terminal board and the bottom of the bottom board, the first portion of the connector strip will make electrical contact with a first terminal on the terminal board, a portion of the lower surface of the contact plate will make electrical contact with a first terminal on the terminal board, a portion of the lower surface of the contact plate will make electrical contact with the upper terminal of the cell pack and a portion of the upper surface of the contact plate will make electrical contact with a second terminal on the terminal board.

2. A dry cell battery contact assembly as defined in claim 1 in which the insulating material overlying a portion of the contact plate is an insulating plate.

3. A dry cell battery contact assembly as defined in claim 1 in which the electrically conductive contact plate and the electrically conductive connector strip are made of metal.

4. A dry cell battery contact assembly as defined in claim 2 in which:
 a. the insulating tape overlying the contact plate is fastened thereto by adhesive means and a portion of the tape covers a portion of the edge of the contact plate;
 b. the electrically conductive connector strip is fastened to the top of the insulating tape by adhesive means and the portion of the strip substantially perpendicular to the first portion is adjacent to the edge of the contact plate and insulated therefrom by the portion of the insulating tape covering the portion of the edge of the contact plate.

5. In a multicell dry cell battery of the type having an internal cell stack with electrical contacts at either end and external terminals at one end only of the battery and a contact strip within the battery for effecting electrical contact between the cell stack terminals and the battery terminals, the improvement in the contact strip which comprises:
 a. an electrically conductive contact plate having an upper and a lower surface;
 b. an electrically insulating sheet overlying and adhered to at least a portion of the upper surface of the contact plate; and
 c. an electrically conductive connector strip having a first portion overlying and attached to a portion of the insulating sheet and insulated from the contact plate thereby, the connector strip having a second portion substantially perpendicular to the first portion of the strip and having an end away from the first portion.

6. A multicell battery as defined in claim 5 in which the electrically conductive contact plate and the electrically conductive connector strip are made of metal.

7. A multicell battery as defined in claim 5 in which:

a. the insulating sheet overlying the contact plate is fastened thereto by adhesive means and a portion of the sheet covers a portion of the edge of the contact plate; and, b. the electrically conductive connector strip is fastened to the top of the insulating sheet by adhesive means and the portion of the strip substantially perpendicular to the first portion is adjacent to the edge of the contact plate and insulated therefrom by the portion of the insulating sheet covering the portion of the edge of the contact plate.

* * * * *